United States Patent

Reynolds

Patent Number: 4,479,657
Date of Patent: Oct. 30, 1984

[54] STROLLER SKIS

[76] Inventor: Florence U. Reynolds, 1529 Derbyshire Rd., Yardley, Pa. 19067

[21] Appl. No.: 429,073

[22] Filed: Sep. 30, 1982

[51] Int. Cl.³ .............................................. B62B 9/04
[52] U.S. Cl. ........................................ 280/8; 188/32; 280/13; 410/10
[58] Field of Search ................. 188/32; 410/3, 10, 23; 280/7.14, 8, 13

[56] References Cited

U.S. PATENT DOCUMENTS

| | | | |
|---|---|---|---|
| 154,120 | 8/1874 | Brooks | 280/13 |
| 304,621 | 9/1884 | Deetz | 280/13 |
| 1,034,749 | 8/1912 | Westman et al. | 280/13 |
| 2,352,966 | 7/1944 | Morando | 280/8 |
| 2,443,699 | 6/1948 | Swain | 280/7.12 X |
| 2,589,602 | 3/1952 | Clark | 280/13 |
| 2,773,564 | 12/1956 | Garard, Sr. | 188/32 |
| 4,161,323 | 7/1979 | Wetteland | 280/7.12 |

FOREIGN PATENT DOCUMENTS

| | | | |
|---|---|---|---|
| 50581 | 4/1932 | Norway | 280/8 |
| 61152 | 7/1939 | Norway | 280/8 |
| 111737 | 9/1944 | Sweden | 280/8 |
| 114889 | 9/1945 | Sweden | 280/8 |

Primary Examiner—Joseph F. Peters, Jr.
Assistant Examiner—Michael Mar
Attorney, Agent, or Firm—Florence U. Reynolds

[57] ABSTRACT

The skis are intended to convert a stroller temporarily into a sled. Each ski is at least as long as the distance between the front and rear edges of the wheels on one side of the stroller and comprises a flat runner having at least one, preferably both ends curved upwardly and a clamping means on the upper surface of each runner for detachably holding each wheel in position on the ski by providing tension forces on the wheels in opposing longitudinal and lateral directions. Preferably, stop members are provided to prevent lateral movement of the wheels on the skis.

1 Claim, 2 Drawing Figures

STROLLER SKIS

BACKGROUND OF THE INVENTION

The present invention relates to a set of skis which may be attached to the wheels of a stroller to convert it temporarily into a sled. Although both sleds and strollers for young children are on the market, there is no device available which can inexpensively provide both types of sliding and rolling motion in the same vehicle. This would be desirable in climates where there is often ice or snow on the sidewalks, preventing normal stroller outings for young children unless a special sled having safety devices for holding a child is purchased. However, a sled cannot be taken into a store and therefore the child would have to be removed and carried while in the store. On the other hand, if a stroller is used in winter weather so that the child can be wheeled while in a store, there is great difficulty pushing the wheels on ice or snow outside.

SUMMARY OF THE INVENTION

Therefore an object of the present invention is to provide a a set of skis to convert a stroller into a sled.

Another object is to provide such a set of skis which are easily attached and detached from the stroller wheels.

A further object is to provide the choice of sliding or rolling motion in one vehicle at a low cost.

The above objects are attained by providing a pair of stroller skis, each having two clamping members for holding the two wheels on each side of the stroller so that the wheels remain securely on the skis when the stroller is being moved either backward or forward. The clamping members may provide clamping tension on either the sides, front, or rear of the wheels. The clamping members may be fastened rigidly to the top surface of the skis or they may be fastened in such a manner as to be slidable so that the skis may be adjusted to fit a variety of strollers with different wheel bases. The clamping members must provide releasable tension on the stroller wheels so that the skis may be easily and quickly removed from the wheels when desired.

DETAILED DESCRIPTION

Figure 1:
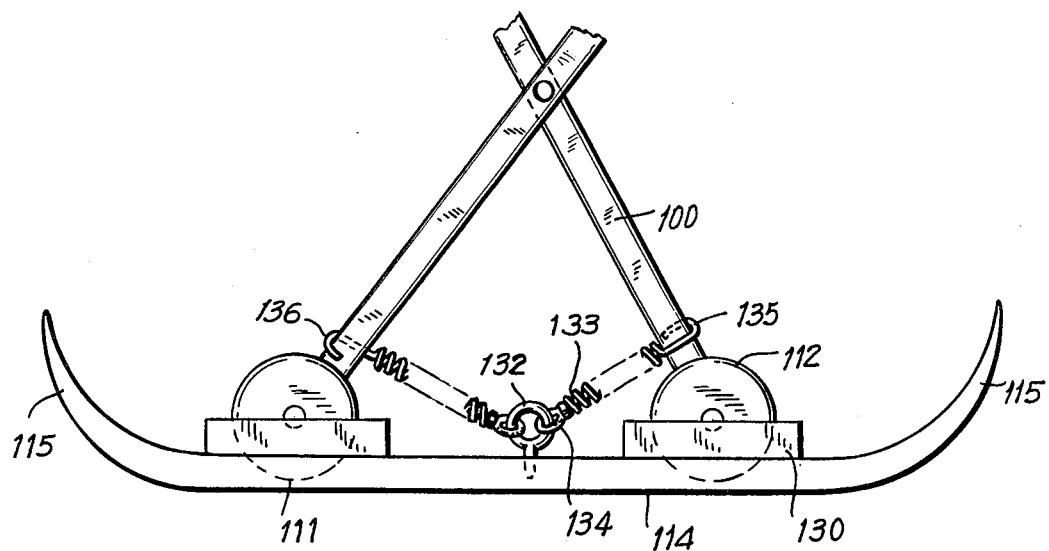
FIG. 1 is a side elevation view of an embodiment of the invention showing a ski in combination with two wheels of a stroller partially shown.
Figure 2:
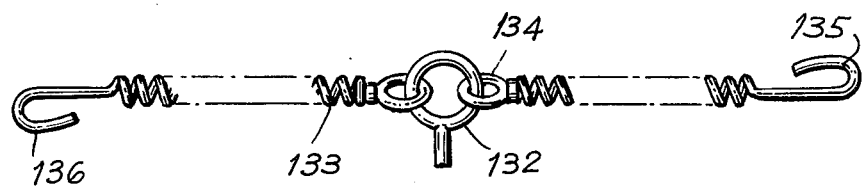
FIG. 2 is an enlarged perspective view of the fastening means shown in FIG. 1.

The embodiment of the invention, which is the best mode as far as simplified construction and use is concerned, is shown in FIG. 1. The ski runner 114 has two rounded ends 115 and indentations 111 to accommodate wheels 112. Side stop members 130 are provided on each side of the wheel indentations 111, preferably up to the middle of the wheels. A central ring member 132 is embedded in the center of the ski runner 114. Two elastic members 133 are attached at one of their ends by rings 134 to the central ring member 132. The other ends of the elastic members 133 are provided with hooks 135, 136 which are adapted to fit over the stroller frame bars 100 and provide a tension force on each wheel 112 to hold it securely to the ski runner 114. The hooks face in opposite lateral directions. The wheel indentations 111 could be omitted and replaced by rough surfaces on the part of the runners under the wheels to provide friction to help in preventing slipping of the wheels on the skis. The stop members for both wheels could be joined as one continuous vertical member on each side of the wheels. On the other hand, by using fairly deep indentations in the runners to accommodate the wheels, the side stop members could be omitted. The important point is to have sufficient stops and elastic tension forces to prevent slipping in any direction.

Although the invention has been described in detail with respect to a specific embodiment, it is understood that these are merely exemplary and that many variations may be made without departing from the scope of the invention as defined in the claims.

I claim:

1. A ski assembly for use with a stroller having a pair of downwardly diverging leg members on each side of the stroller and at least one wheel attached to the lower end of each leg member, said assembly comprising a pair of skis, each ski comprising a runner having upwardly curved ends, a central flat upper surface, and being long enough to support the pair of wheels on one side of the stroller; each ski having two longitudinally spaced, downwardly curved indentations extending below the upper surface of the ski and being spaced apart for receiving the lower portions of said pair of wheels; a pair of longitudinally extending, parallel, vertical stop members, one stop member being positioned on each side of each said indentation; and a pair of elastic straps, one end of each strap being anchored centrally on the upper surface of the runner and the other end of each strap having an open hook for releasably engaging the lower end of one of said pair of leg members, wherein when said hooks are engaged with said leg members, the open portions of said hooks are facing in opposite lateral directions and each pair of wheels are held in position on the ski by opposing elastic tension forces on said leg members.

* * * * *